United States Patent [19]
Kirchner

[11] Patent Number: 5,409,042
[45] Date of Patent: Apr. 25, 1995

[54] CONSTANT-RATE FLOW CONTROL VALVE

[75] Inventor: Mark Kirchner, Seattle, Wash.

[73] Assignee: Romac Industries, Inc., Seattle, Wash.

[21] Appl. No.: 99,244

[22] Filed: Jul. 29, 1993

[51] Int. Cl.[6] .............................. F16L 1/14; B05B 1/26
[52] U.S. Cl. ........................................ 138/42; 138/40
[58] Field of Search ................... 138/40, 42, 43, 46, 138/45

[56] References Cited

U.S. PATENT DOCUMENTS

| | | |
|---|---|---|
| 2,050,016 | 9/1936 | Newman . |
| 2,353,161 | 7/1944 | Heigis et al. . |
| 2,389,134 | 11/1945 | Brown . |
| 2,450,461 | 10/1948 | Wallach . |
| 2,504,678 | 4/1950 | Gardner ........................ 138/43 |
| 2,555,597 | 6/1951 | Nault ........................... 138/43 |
| 2,716,997 | 9/1955 | Crookston . |
| 2,762,397 | 9/1956 | Miller . |
| 2,816,572 | 12/1957 | Pratt . |
| 2,829,674 | 4/1958 | Segelhorst et al. . |
| 2,834,379 | 5/1958 | Fields .......................... 138/43 |
| 2,936,790 | 5/1960 | Dahl et al. ..................... 138/46 |
| 2,957,496 | 10/1960 | Bartnik ......................... 138/43 |
| 2,989,086 | 6/1961 | Dahl . |
| 3,050,086 | 8/1962 | Honsinger . |
| 3,189,125 | 6/1965 | Windsor et al. ................. 138/43 |
| 3,340,899 | 9/1967 | Welty et al. ................... 138/43 |
| 3,431,944 | 3/1969 | Sakuma ......................... 138/43 |
| 3,768,507 | 10/1973 | Dicken ......................... 138/45 |
| 3,934,614 | 1/1976 | Elek et al. . |
| 3,958,603 | 5/1976 | Bannon et al. . |
| 3,991,792 | 11/1976 | Kettler . |
| 4,437,493 | 3/1984 | Okuda et al. ................... 138/45 |
| 4,800,925 | 1/1989 | Yeaman ......................... 138/43 |
| 4,883,093 | 11/1989 | Miles et al. . |
| 4,986,312 | 1/1991 | Gute . |
| 5,027,861 | 7/1991 | Gute . |

Primary Examiner—James E. Bryant, III
Attorney, Agent, or Firm—Christensen, O'Connor, Johnson & Kindness

[57] ABSTRACT

An apparatus to control fluid flow to an approximate fixed rate is disclosed. The apparatus includes a housing (12), an orifice (22), a diaphragm (24), and a cage (26). The housing has two ends, an inlet end (18) having an inlet opening and an outlet end (20) having an outlet opening. The ends are arranged and configured to receive piping (14 and 16). The orifice is disposed within the housing. The orifice has an upstream end and a downstream end with a seat (34) formed in the upstream end. The fluid flows over the seat and through the orifice before exiting the outlet end of the housing in normal flow. The diaphragm is disposed within the housing adjacent and upstream of the seat of the orifice. The diaphragm has an upstream side, a downstream side, and sidewalls. The downstream side of the diaphragm is opposite the seat such that a pressure drop across the diaphragm pulls the downstream side of the diaphragm toward the seat. The cage surrounds at least a portion of the sidewalls of the diaphragm. The cage has ribs (38) projecting toward and contacting the sidewalls of the diaphragm to hold the diaphragm away from the housing and to allow reduced flow restriction between the housing and the sidewalls.

31 Claims, 10 Drawing Sheets

CONSTANT-RATE FLOW CONTROL VALVE

FIELD OF THE INVENTION

This invention relates generally to devices to control fluid flow, and more particularly, to an automatic fluid flow control valve that maintains a constant rate of flow over a wide range of fluid pressure drops across the valve.

BACKGROUND OF THE INVENTION

Flow regulator valves are typically used to balance the flow rate of water to and from heating and cooling coils when several coils are supplied from one pump incorporating many branches in the flow circuit. For this reason, the valves are typically called balancing valves because they balance the flow rate of water to each coil, although they are often used to balance flow control rates for other applications. The valves are most often used to control the flow rates of fluids with viscosities similar to that of water to fixed flow rates with variations in pressure drop across the valves. Without a flow regulation valve, as the pressure drop across a fixed orifice is increased, the flow rate is increased accordingly.

Prior-art devices have been used to achieve flow regulation by employing a squat rubber "torpedo" (resilient diaphragm), as in U.S. Pat. No. 3,189,125 ("the '125 patent"). The torpedo is forced against a contoured orifice as the pressure drop increases across the valve. Increasing pressure drops across the device will progressively press the torpedo against the contoured orifice, causing the flow area between the torpedo and the contour to be reduced. The reduction in flow area is sufficient to restrict the flow to a more-or-less constant value even though the pressure drop across the flow area has increased (see FIG. 14 of the '125 patent). However, many of the existing balancing valves utilize ribs that are molded onto the torpedo to keep it concentrically centered in the flow path immediately upstream of the contoured orifice. See, e.g., U.S. Pat. Nos. 5,027,861; 4,986,312; 3,189,125 and 3,958,603. The fluid first flows around the front of the torpedo, then through the annular section between the walls of the flow passage and the torpedo. Next, the fluid is diverted into the flow section between the torpedo and the contoured orifice (the variable flow area section) then exits out the back of the contoured orifice.

A limitation to the prior-art control devices is that they require approximately 10 pounds per square inch of pressure drop to start to control the flow rate to a fixed value (within the flow tolerance of the device). An initial pressure drop of at least four pounds would be closer to the ideal low end of the range within which a valve should operate to regulate flow. Lower required pressure drops help to reduce the required pump size, which conserves energy costs and reduces the purchase price of the pump. A large portion of the pressure drop that occurs before the device controls the flow is caused by the restriction in the annular space between the torpedo and the flow line walls. The tight 90-degree bend that the fluid must take to enter the variable flow area also creates an unnecessary restriction.

The annular space could be increased and hence reduce the pressure losses by simply making the ribs that center the torpedo larger and increasing the inside diameter of the walls of the flow passage. The problem with this approach is that the longer ribs would be too flimsy to accurately center the torpedo over the contoured orifice.

Other prior art valves are constructed of rubber elements that bend to restrict flow. For example, U.S. Pat. No. 4,986,312 discloses a flow control device utilizing a rubber disk that bends as flow increases through its center. However, most of these devices are subject to excessive bending-beam creeping and, thus, inaccuracies over time.

The orifice contours are also not ideally conducive to small pressure drops across the valve. Also, during backflow conditions, such as when backflushing a system, the prior art valves may not allow fluid to freely pass in a reverse direction, or the torpedo may become dislodged.

SUMMARY OF THE INVENTION

The valve of the present invention provides improved centering of a rubber torpedo (diaphragm), compared to molded ears, that in turn improves accuracy of the flow control. The invention also includes other features, as explained below and in the detailed description of the preferred embodiment, to improve the accuracy of control especially at low pressure drops across the value.

In accordance with this invention, an apparatus to control fluid flow is disclosed. The apparatus includes a housing, a first orifice, a first diaphragm, and a first cage. The housing has two ends, an inlet end having an inlet opening and an outlet end having an outlet opening. The ends are arranged and configured to receive piping. The first orifice is disposed within the housing. The first orifice has an upstream end and a downstream end with a seat formed in the upstream end. In normal downstream flow the fluid flows over the seat and through the first orifice before exiting the outlet end of the housing. The first diaphragm is disposed within the housing adjacent and upstream of the seat of the first orifice. The first diaphragm has an upstream side, a downstream side, and sidewalls. The downstream side of the diaphragm is adjacent the seat such that a pressure drop across the diaphragm holds the downstream side of the diaphragm toward the seat. The first cage surrounds at least a portion of the sidewalls of the first diaphragm The first cage has ribs projecting toward and contacting the sidewalls of the first diaphragm to hold the first diaphragm away from the housing and to minimize the flow restriction between the housing and the sidewalls.

In the preferred embodiment of the invention the first cage further includes outer walls that abut against the interior of the housing, the ribs projecting inwardly from the outer walls of the first cage. The outer walls of the first cage form a "C" shape. The first cage is formed of flexible material such that the two ends of the C-shaped walls are compressible to:yard one another to reduce the overall outer size of the first cage. Preferably, the housing is a one-piece housing having an internal cross-sectional area, into which the first cage fits, larger than the cross-sectional area of either the inlet or the outlet openings. The first cage is insertable into the housing, and removable from the housing, by compression of the first cage to reduce its overall outer size such that it is slightly smaller than the size of the inlet opening.

In accordance with a particular preferred aspect of the invention, the first orifice seat includes at least one channel formed therein through which the fluid flows when entering the first orifice before exiting the housing. The first diaphragm regulates flow by moving within the channel when the pressure drop across the first diaphragm increases. Preferably, the channel includes first steeply sloped walls forming a "V" shape. The point of the "V" is in the downstream direction. The channel also includes gently sloped walls upstream of the first steeply sloped walls and second steeply sloped walls upstream of the gently sloped walls. In the preferred embodiment of the invention, at least two channels are formed in the seat of the first orifice. Each channel has first and second steeply sloped walls and gently sloped walls. The second steeply sloped walls of each channel form legs between the channels extending in an upstream direction. For a pressure drop of zero to approximately eight psi the downstream side of the first diaphragm only comes in contact with the upstream side of these legs. The first orifice further includes a sleeve on its downstream end. The first orifice is separable from the housing. The housing includes a first orifice shoulder upon which the first orifice sits, the sleeve extending beyond the first orifice shoulder of the housing in a downstream direction.

In another embodiment of the invention the first orifice is an integral portion of the housing, formed within the housing.

In accordance with another preferred aspect of this invention, the housing includes a first cage recess into which the first cage is placed. A spring is disposed within the first cage recess downstream of the first cage. The spring is arranged and configured such that the first cage and the first diaphragm, which is held within the first cage, are biased in an upstream direction. The first cage further includes means to hold the first diaphragm sidewalls from substantial downstream movement relative to the first cage. Preferably, the holding means include holding tabs attached to at least one of the ribs and a perimeter groove around the first diaphragm. The holding tabs project inwardly from the ribs and engage the perimeter groove.

In accordance with another preferred aspect of the invention, the first cage includes ribs projecting inwardly from each end of the C-shaped walls. Tabs extend from the inward ends of the ribs in a tangential direction to the center of diaphragm 24 and cage 26. The tabs are arranged and configured for ease of compression of the first cage for insertion and removal of the first cage from the inlet opening of the housing.

At least one of the cage ribs extends at least partially over the upstream side of the first diaphragm to prevent the first diaphragm from being moved substantially out of position during backflow conditions. Preferably, the first cage includes at least three ribs that extend at least partially over the upstream side of the first diaphragm. The three ribs have cleats projecting downstream from their extensions over the upstream side of the first diaphragm. The cleats contact the upstream side of the first diaphragm.

In accordance with an alternate embodiment of the invention, the first cage is an integral portion of the housing. The ribs project inwardly from the interior walls of the housing. In accordance with another alternate embodiment of the invention, a second orifice is disposed within the housing adjacent the first orifice. The second orifice has an upstream end and a downstream end with a seat formed in the upstream end. Fluid flows over the seat and through the second orifice before exiting the outlet end of the housing in normal flow. A second diaphragm is disposed within the housing adjacent and upstream of the seat of the second orifice. The second diaphragm has an upstream side, a downstream side, and sidewalls. The downstream side of the second diaphragm is opposite the seat such that a pressure drop across the second diaphragm holds the downstream side of the second diaphragm toward the seat. A second cage surrounding at least a portion of the sidewalls of the second diaphragm is also included. The cage has ribs projecting toward and contacting the sidewalls of the second diaphragm to hold the second diaphragm away from the housing and to minimize the flow restriction between the housing and the sidewalls. In accordance with one alternate embodiment, the first and second cages are integral portions of the housing. The ribs project from interior walls of the housing.

In accordance with another preferred aspect of the invention, the first diaphragm includes a conical portion on its downstream side. The point of the conical portion is directed downstream. The conical portion serves to direct the flow through the first orifice and toward the outlet opening after flowing over the seat. The upstream side of the first diaphragm is conical in the preferred embodiment.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
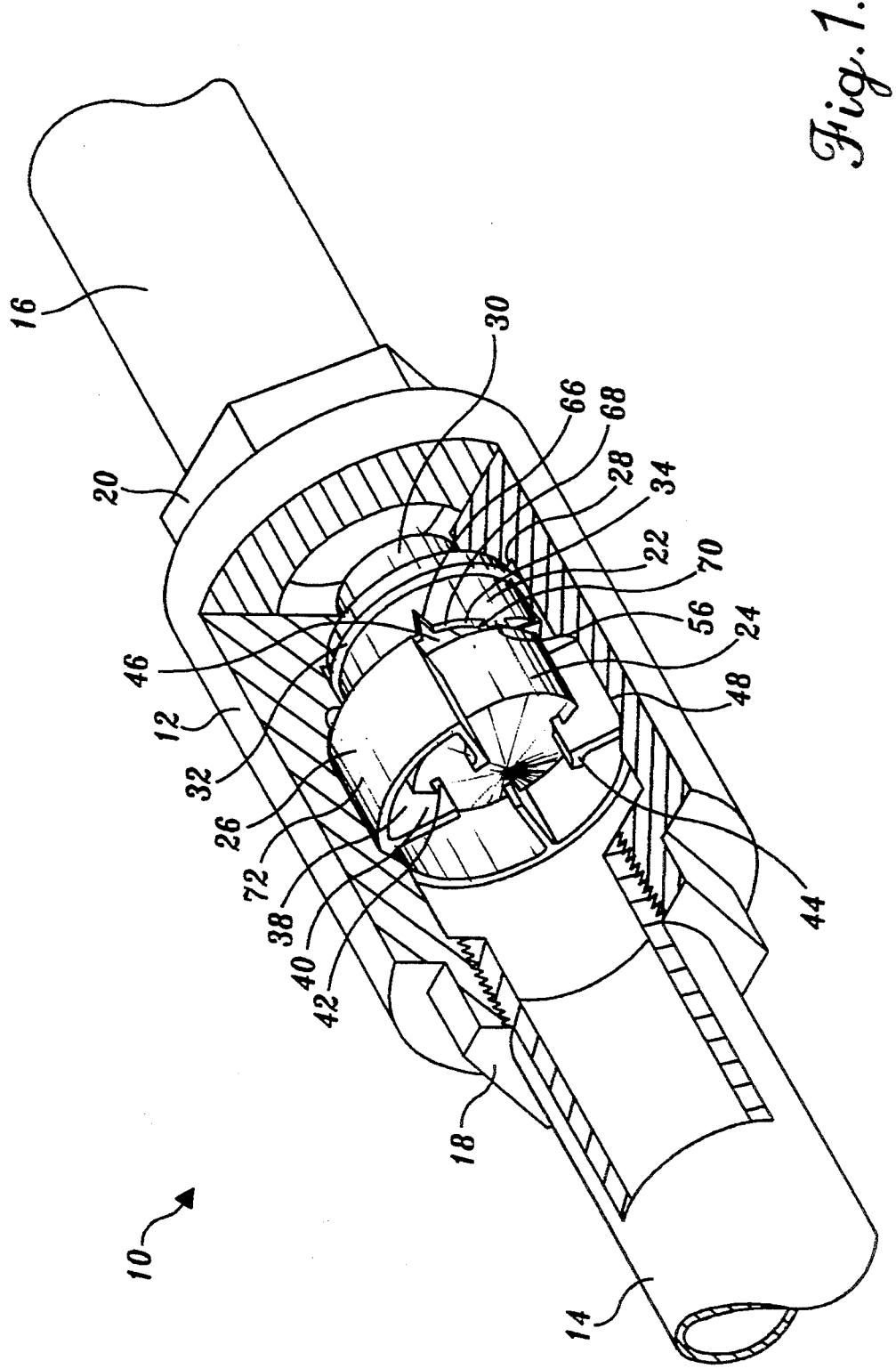
FIG. 1 is an isometric view of the valve of the present invention with a portion of the inlet pipe and housing removed to illustrate the internal structure of the valve.
Figure 2:
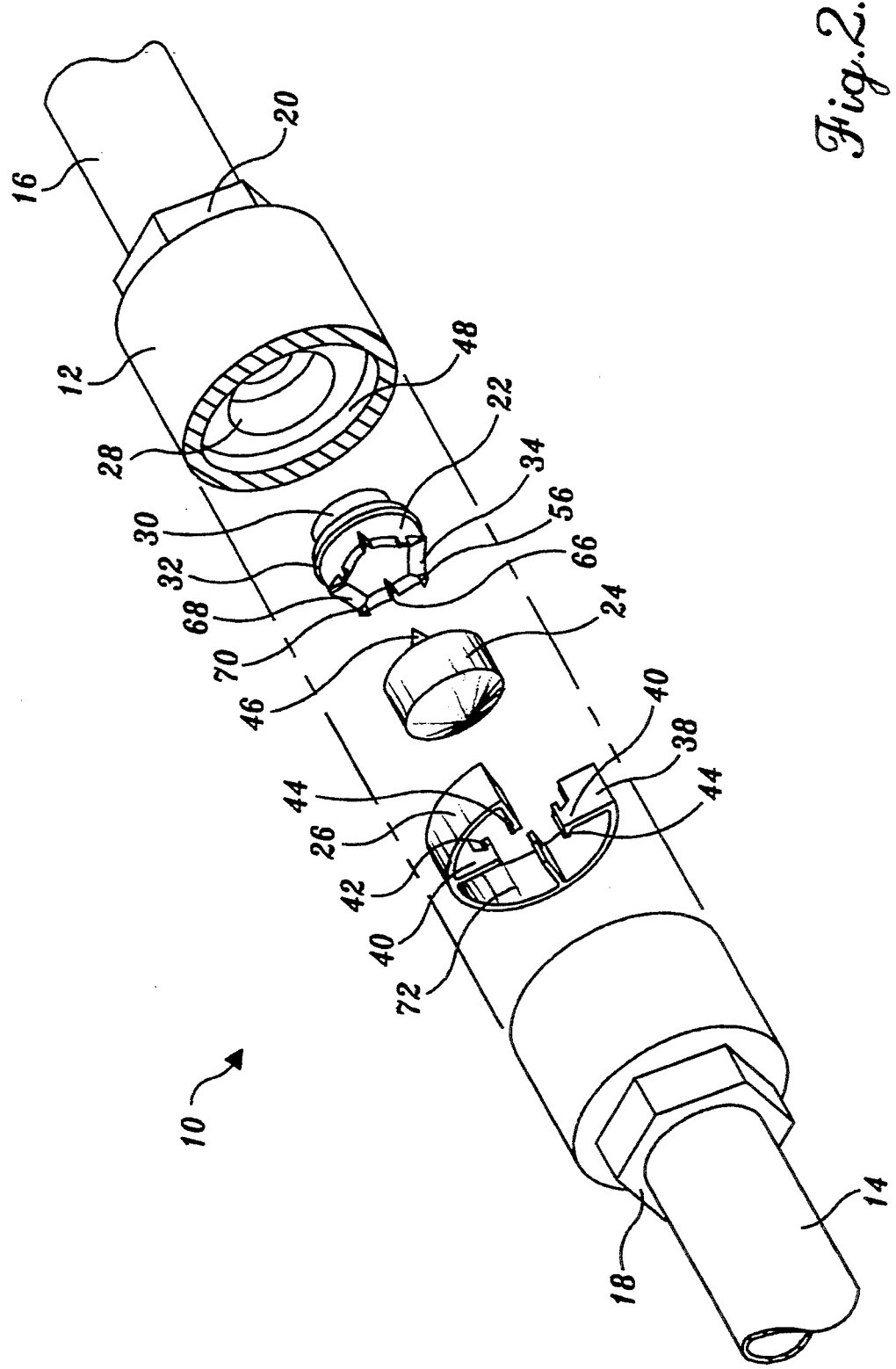
FIG. 2 is an isometric exploded view of the valve of the present invention with the housing cut laterally in its center.

The preferred embodiment of a valve 10 of the present invention is illustrated in FIGS. 1 and 2. The valve includes a cylindrical housing 12 into which an inlet pipe 14 and an outlet pipe 16 are connected. The housing includes a housing inlet 18 that connects to inlet pipe 14 and a housing outlet 20 that connects to outlet pipe 16. The connections of pipes 14 and 16 to housing 12 may be by threaded engagement or any other conventional means. An orifice 22, a diaphragm 24, and a cage 26 are disposed within housing 12. Orifice 22 is comprised of a cylindrical body that rests on a shoulder 28 of housing 12 adjacent housing outlet 20. A sleeve 30 is attached to the downstream end (nearer housing outlet 20) of the body of orifice 22. The outer diameter of sleeve 30 is somewhat smaller than that of orifice 22 while the inner diameter is preferably equal to that of orifice 22 such that sleeve 30 provides a conduit through which the flow is channeled just before exiting housing 12. The function of sleeve 30 is to reduce the erosions/corrosion of housing 12 as the fluid exits orifice 22. The outer perimeter of the body of orifice 22 includes a groove within which an O-ring 32 is disposed. O-ring 32 seats tightly against the interior of housing 12 such that fluid is not allowed to circumvent orifice 22 around its outer walls. A contoured seat 34 is formed in the upstream end of orifice 22. In the preferred embodiment, seat 34 includes first steeply sloped walls 66 that form a V-shaped channel, gently sloped walls 68 on either side of first steeply sloped walls 66, followed by second steeply sloped walls 70, all combining to form a channel through which the fluid flows. Four such channels are formed around the top edge of orifice 22 evenly spaced such that four legs 56 project in an upstream direction and contact the downstream side of diaphragm 24. Because of the small top surface area of legs 56, the proper centering of diaphragm 24 by cage 26 is even more critical with this embodiment.

Diaphragm 24 comprises what may be termed a "rubber torpedo." Diaphragm 24 is preferably made of rubber but could alternatively be made of another elastomer. Diaphragm 24 has a circular cross section with parallel sidewalls, a conical upstream side, and a flat downstream side with a flow straightener cone 46 disposed in the middle of the downstream side. The diameter of diaphragm 24 is preferably approximately the same as, or just smaller than, that of orifice 22 for the purposes of fitting the largest control mechanism into single-piece housing 12.

Diaphragm 24 is held in place centrally over seat 34 of orifice 22 by cage 26. Cage 26 includes an outer wall 72 having a "C" shape. In the preferred embodiment, the C shape is approximately 240 degrees of a short circular cylinder. The 120 degrees that are removed, in other words the open section, in the preferred form of the cage allow the cage to be compressed together such that it has a smaller perimeter for insertion into housing 12. Cage 26 includes four cage ribs 38 that project radially inward from outer wall 72 at evenly spaced locations beginning at the ends of C-shaped outer wall 72. A larger or smaller number of ribs 38 could be used. The ribs could also alternatively be unevenly spaced. Optimally between three and six ribs 38 are used, preferably four. The main portions of cage ribs 38 extend inwardly enough to provide a slight interference fit with diaphragm 24 such that diaphragm 24 is held between cage ribs 38 on its sidewalls. Diaphragm 24 can slide in the axial direction and is not bonded to cage 26.

Cage ribs 38 also include rib extensions 40 that project further radially inward from the main portions of cage ribs 38 over the upstream side of diaphragm 24. Cleats 42 extend in a downstream direction from rib extensions 40. Cleats 42 press against the upstream surface of diaphragm 24 such that a biasing force in a downstream direction against seat 34 of orifice 22 is provided by the tendency of the rubber composition of diaphragm 24 to assume its original shape. The pressure of cleats 42 against diaphragm 24 in a downstream direction helps compensate for any minor slop or interference in machining of the interior of housing 12 or in any of the other component parts of valve 10. Cleats 42 also allow diaphragm 24 to move completely away from orifice seat 34 during backflushing operations where fluid is forced in a reverse direction through valve 10. Finally, cage 26 also includes cage compression tabs 44 that extend from cage ribs 38, which are disposed at the ends of outer wall 72. Cage compression tabs 44 aid in assembly and disassembly of valve 10 by providing a convenient place where cage 26 may be compressed into a smaller diameter shape such that cage 26 along with diaphragm 24 may be inserted or removed from housing 12.

Note that housing 12 in the preferred embodiment is a one-piece housing, such that all components within housing 12 that are not integral parts of housing 12 must be inserted therein to construct wave 10 (the use of a one-piece housing reduces the cost of valve 10). The axial tolerances of a cage recess 48, described below, relative to orifice 22 are widened when using the cage to achieve a slight compression of the diaphragm against the orifice at the lower pressure drops. The compression also helps stop the flow rate from creeping to lower values during low pressure drops. The reduction in flow with valve 10 having no clears 42 is a result of slight bending beam action and the initial compression of the top of seat 34. Stated another way, cleats 42 digging into diaphragm 24 allow diaphragm 24 to creep to the approximate shape that diaphragm 24 would have achieved over an approximate two day period at the lower pressure drops. All internal components are inserted through housing inlet 18. First, orifice 22 is placed within housing 12 and seated upon shoulder 28, O-ring 32 squeezing against the sides of housing 12 to form a seal. Diaphragm 24 is placed within cage 26 after which cage 26 and diaphragm 24 are compressed such that cage 26 has a small enough diameter to fit within housing inlet 18. This may be done by using a tool such as needle-nose pliers to compress cage 26 by applying pressure between ribs 38, which extend from the ends of outer wall 72. Cage compression tabs 44 assist by not allowing the tool to slip from tabs 38. Because diaphragm 24 is comprised of a flexible rubber material, it is compressed between ribs 38 as cage 26 is compressed. Cage 26 is also formed of a flexible material such as Delrin plastic. Once cage 26 with diaphragm 24 is in place, the compressive force on ribs 38 is removed such that cage 26 seats within cage recess 48 formed within housing 12. Cage recess 48 ensures that cage 26 maintains its proper position and orientation within housing 12 during normal and backflow conditions.

Figure 3A:
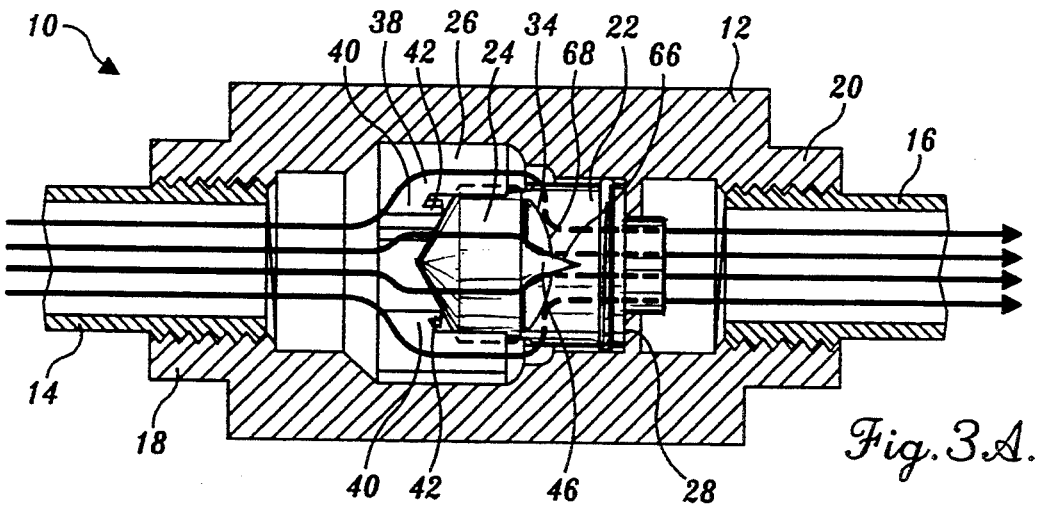
FIG. 3A is a side view of the valve with the housing, inlet pipe, and outlet pipe in cross section, the flow conditions at low pressure drop across the valve being shown.
Figure 3B:
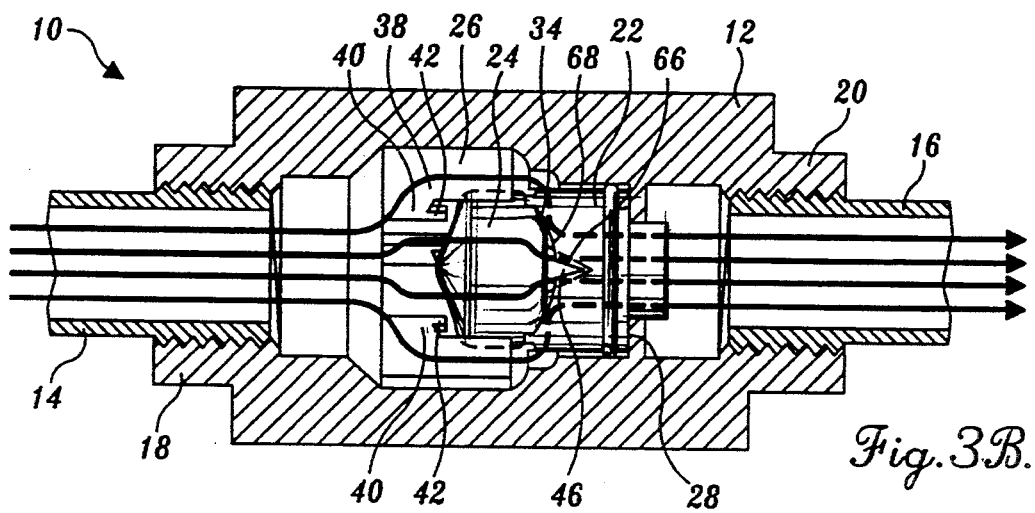
FIG. 3B is a view similar to that shown in FIG. 3A with a moderately high pressure drop across the valve.
Figure 3C:
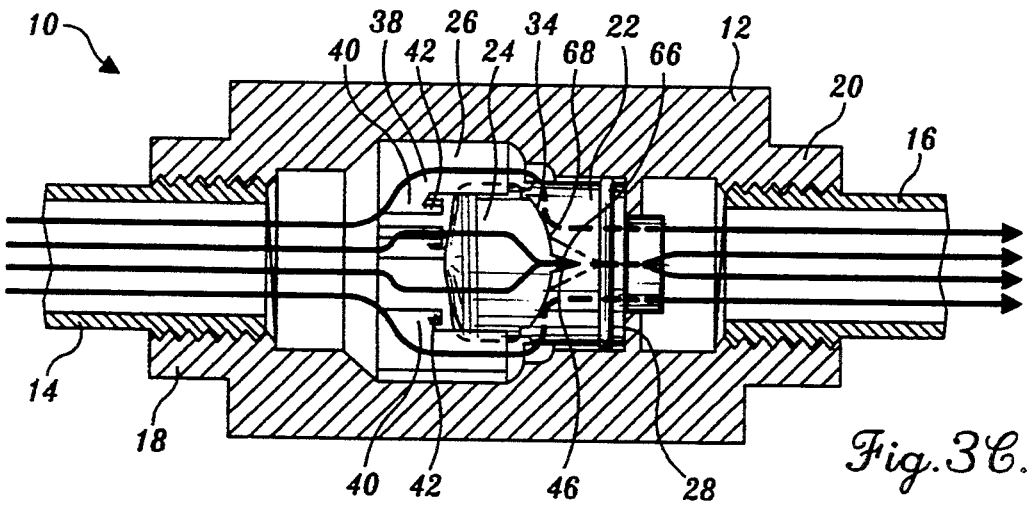
FIG. 3C is a view similar to those shown in FIGS. 3A and 3B with a high pressure drop across the valve.

With the above-described construction, the valve operates by fluid flowing through inlet pipe 14 and housing inlet 18 to cage 26 and diaphragm 24. The fluid flows between ribs 38 and outer wall 72 around the sidewalls of diaphragm 24. The flow then proceeds over seat 34 and into orifice 22 to then exit through sleeve 30, housing outlet 20, and into outlet pipe 16. The details of the function of the valve during flow conditions are illustrated in FIGS. 3A through 3C. FIG. 3A illustrates a state of low pressure drop across the valve. In this state, diaphragm 24 is virtually undeformed such that the flow through valve 10 proceeds around diaphragm 24 between ribs 38 of cage 26 and through large channels formed between the bottom surface of diaphragm 24 and the upstream edge of seat 34. This large channel allows a large amount of flow such that, even at low pressure drops across the valve (typically down to 5 psid), accurate flow is maintained to outlet pipe 16. Small changes in the area of the channel are first accounted for by diaphragm 24 deforming over the relatively small top surface areas of legs 56. Before this deformation, value 10 acts as a fixed orifice device.

FIG. 3B illustrates a state of moderately high pressure drop across the valve corresponding to a high fluid pressure into housing inlet 18. As the fluid pressure increases, diaphragm 24 is squeezed into a new shape. In this state, the pressure drop across diaphragm 24 causes the bottom surface of diaphragm 24 to be pulled against seat 34 of orifice 22 such that the channels through which the flow may pass are much more restricted in area. The reduction in area of the channels is so proportioned to the increase in pressure that the net result is approximately the same fluid flow as existed before the pressure increase.

Finally, in FIG. 3C, a state of extremely high fluid inlet pressure is shown. In this state, diaphragm 24 is pulled not only into gently sloped walls 68, but also partially into first steeply sloped walls 66 such that the channel through which flow may proceed is quite small. Therefore, the high-pressure flow is restricted such that the same amount of flow proceeds through housing outlet 20 as in the situation described in both FIGS. 3A and 3B.

The above-described valve 10 construction results in a larger annular flow area around the side of diaphragm 24 than prior valves using molded rubber ribs to provide spacing. The ribs do not provide adequate spacing between the prior control member and the housing walls to minimize flow restriction. If ribs that extend further radially to provide a larger flow area were molded on diaphragm 24, they would have to be thicker in section than cage ribs 38 since rubber is far more flexible than is an injection-molded thermoplastic, such as would be used to construct cage 26. The increased rubber section would in turn reduce the annular area around diaphragm 24 so the rubber ribs would have to extend further radially than cage ribs 38 to attain the same annular flow area. Cage 26 with ribs 38 is preferred since rubber ribs may not provide adequate centering in some situations.

The design of valve 10 results in a reduction in flow restriction over existing valve designs. This reduction results from increased flow area around the sidewalls of diaphragm 24 that in turn allows a widening of the 90 degree bend that the fluid must make to enter orifice 22. These two factors result in a combined loss of restriction. The increased flow area provides less fluid velocity around the side of diaphragm 24, which allows the use of more economical materials such as ductile iron instead of brass for fresh water. Reducing the fluid velocity that the ductile iron is exposed to allows the ductile iron to keel:, its protective layer of magnate that would be continually washed away by erosion/corrosion if higher fluid velocities existed. Similarly, a brass body material may be used instead of a monel body for seawater use to attain additional savings when the fluid velocity is low enough (e.g., less than about five feet per second).

Since cage 26 can be economically molded out of corrosion-resistant and nonmetallic materials, valve 10 is adaptable to control the flow rate of corrosive fluids or fluids that require that no metal contact the fluid.

Even at minimal flow rates, cage 26 reduces the pressure loss around the side of diaphragm 24 and into orifice, seat 34. This reduction in pressure loss allows valve 10 to begin to control the flow at a lower pressure drop than would otherwise be possible, which in turn allows tile end user to specify a smaller pump, which in turn reduces the installation cost and the operating cost of the hydronic portion of a system (such as an air conditioning system).

Rib extensions 40, combined in the preferred embodiment with cleats 42, reduce the rotational movement of diaphragm 24 about an axis perpendicular to the longitudinal axis of valve 10 (end-over-end rotation). This reduction of rotational movement improves the accuracy of the flow control. Rib extensions 40 allow a high pressure drop to be applied to valve 10 in reverse flow without diaphragm 24 being swept out of housing 12. The configuration of the present invention also allows more water to pass at the same pressure drop in reverse flow compared to prior-art designs. This increased flow rate in reverse flow allows more complete flushing of hydronic heating and cooling systems.

Cleats 42, used in the preferred embodiment of the invention, add to this advantage by allowing diaphragm 24 to move longitudinally slightly upstream during backflow, the top surface of diaphragm 24 deflecting somewhat against cleats 42.

Cage 26 also provides a precise way of locating diaphragm 24 in the axial direction above orifice 22. This axial location is particularly important to improve the flow accuracy at lower pressure; drops across valve 10. If diaphragm 24 were inadvertently held off orifice seat 34 at lower pressure drops an out-of-tolerance high flow would exist until diaphragm 24 is pulled down onto orifice seat 34. This process would cause surges in the flow rate through valve 10 known as "hunting." On the other side of the spectrum, if diaphragm 24 were pressed onto orifice seat 34 too firmly, valve 10 would require a greater pressure drop to begin to control the flow to a specified tolerance. By purposely biasing diaphragm 24 onto orifice seat 34 with a controlled amount of force, the amount of creeping that diaphragm 24 experiences during the lower pressure drops may be reduced since a controlled set is applied. This creep reduction, in turn, holds the reduction in the flow rate, which may occur over time due to creeping, to a lower level.

Cleats 42 also help in this regard. Since the surface area of cleats 42 in contact with the top surface of diaphragm 24 is small, the slop or interference in the axial tolerances of housing 12, cage 26, and orifice 22 can be largely taken up with diaphragm 24 being slightly compressed into cleats 42. In other words, the milling of cage recess 48, cage 26, orifice seat 34, the bottom of orifice 24, and shoulder 28 does not have to be as exact.

This will reduce manufacturing costs along with valve performance.

Legs 56 on orifice seat 34 are helpful at low pressure drops to allow diaphragm 24 to easily be pulled partially into the channel formed between seat 34 and diaphragm 24. The profile of seat 34 provides a contour with second steeply sloped walls 70 that are short and will not cause diaphragm 24 to "cork," while supporting the entire bottom surface of diaphragm 24 onto four legs 56 and, hence, providing greater sensitivity for the lower pressure drops. Concentrating the support for the entire area of diaphragm 24 onto the small tops of four legs 56 increases the sensitivity of the device at the lower pressure drops. As the pressure is increased, diaphragm 24 contacts most of seat 34.

Figure 4:
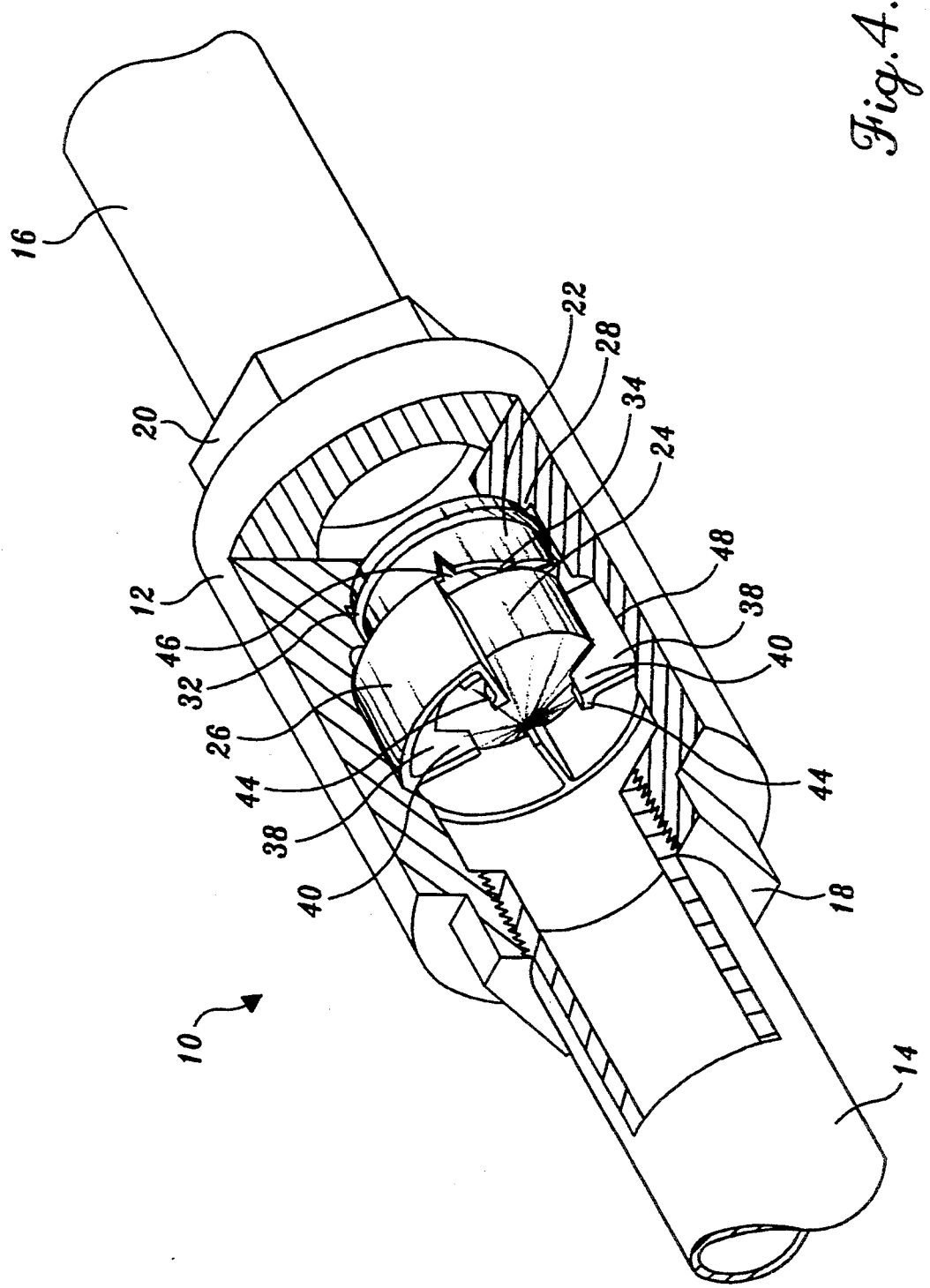
FIG. 4 is an illustration of an alternate embodiment of the valve shown with a portion of the inlet pipe and housing cutaway.

FIG. 4 illustrates an alternate embodiment of the invention with several minor changes in the components of valve 10. First, sleeve 30 has been removed such that orifice 22 is simply a cylindrical member with seat 34 on the upstream side and a flat edge that rides against shoulder 28 on the downstream side. Seat 34 has itself been changed, as well, from the preferred embodiment described above. Seat 34 in this embodiment does not include legs 56 formed by second steeply sloped walls 70. This may be a desirable configuration if only high-pressure drops across the valve are anticipated in normal use. Legs 56 may also not be needed in only low pressure ranges are to be used. The advantage of legs 56 is realized principally when large variations in pressure are anticipated. Cleats 42 have been removed in this embodiment such that rib extensions 40 seat against the upstream side of diaphragm 24.

Figure 5:
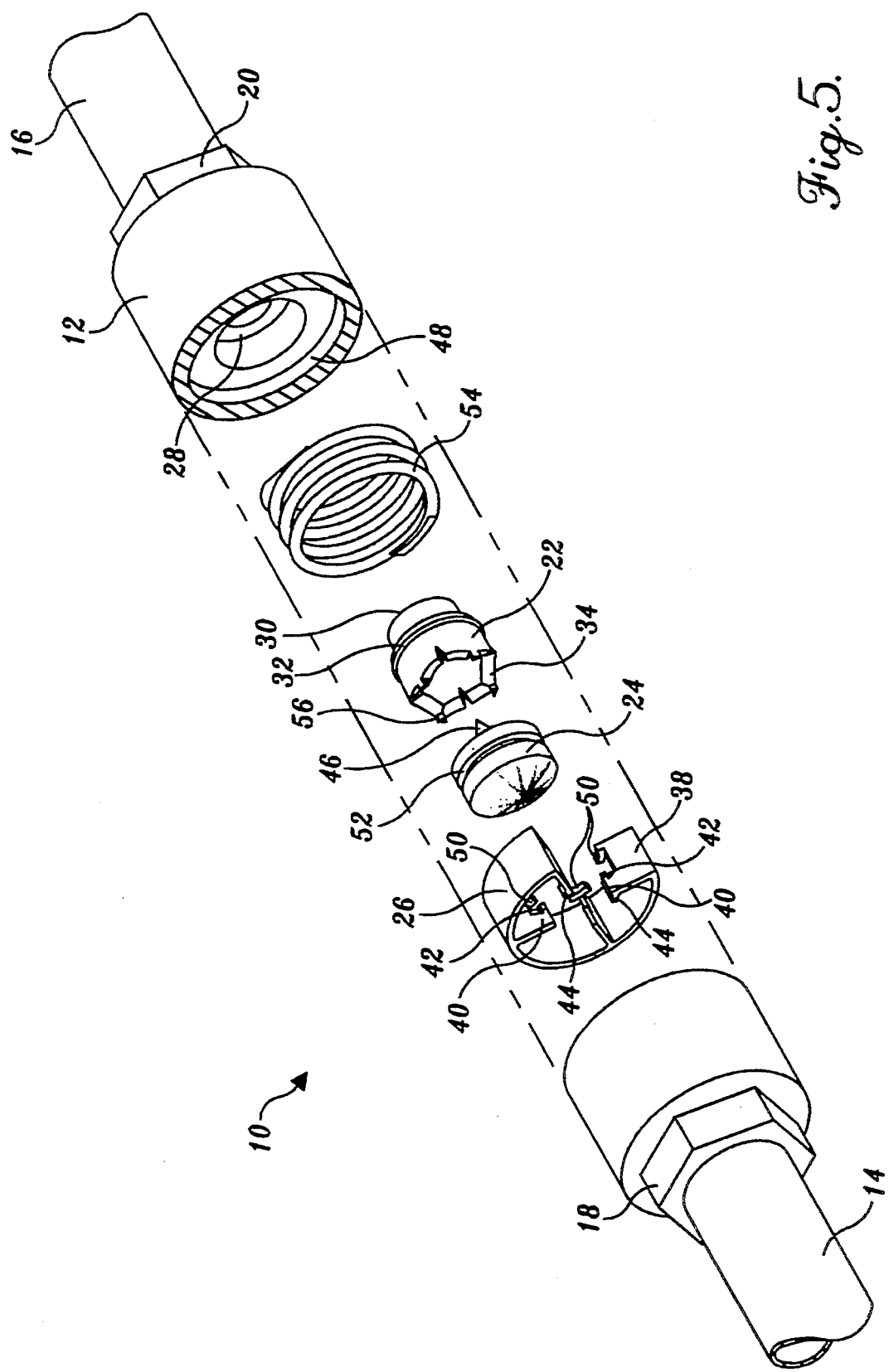
FIG. 5 is an exploded isometric view of an alternate embodiment of the invention with a spring.
Figure 6:
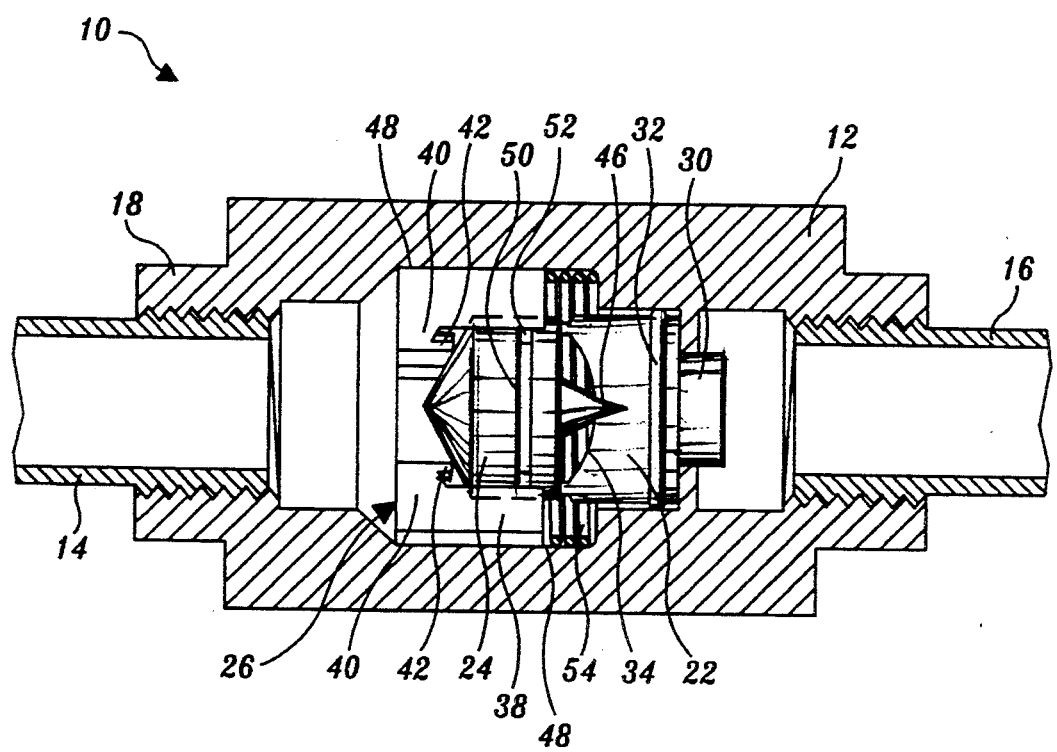
FIG. 6 is a cross-sectional view of the embodiment shown in FIG. 5.

Referring now to FIGS. 5 and 6, another alternate embodiment of the invention will now be described. The principal structural change in this embodiment is a spring 54 that is disposed within cage recess 48 on the downstream side of cage 26, cage recess 48 being longer so as to permit both spring 54 and cage 26 to be disposed therein. The purpose of spring 54 is to compensate for the hysteresis in the rubber at the lower pressure drops (i.e., five to 15 psid). In this range the percent of error in the flow rate is effected most by hysteresis. Spring 54 functions to bias cage 26 with diaphragm 24 disposed therein in a direction away from orifice 22. In this manner, valve 10 can more accurately compensate for low pressure drops across diaphragm 24 and provide a larger channel through which the fluid may flow over seat 34. Once the pressure drop is high enough, spring 54 will be compressed such that diaphragm 24 seats solidly against seat 34 and begins to deform within it to further restrict flow.

To ensure that diaphragm 24 stays within cage 26, holding tabs 50 and a perimeter groove 52 are used holding tabs 50 are connected to ribs 38 of cage 26 and extend generally perpendicular to ribs 38 in directions conforming to the shape of diaphragm 24. Holding tabs 50 fit within perimeter groove 52, which is formed within the sidewalls of diaphragm 24. Due to the engagement of holding tabs 50 within perimeter groove 52, diaphragm 24 is held within cage 26 while still permitting deformation of the lower surface of diaphragm 24 into seat 34. Diaphragm 24 is allowed to move in an axial direction in relation to orifice 22 by cage 26 sliding in relation to housing 12. Spring 54 surrounds the upstream portion of orifice 22 but does not contact orifice 22 such that flow over seat 34 is not obstructed. In this embodiment, housing 12 may be either one piece or two pieces. If a one-piece housing is used, spring 54 may be inserted by tightly winding its coils within their elastic range such that its diameter is reduced. Once placed within cage recess 48, spring 54 may be released to assume its normal shape such that its diameter expands into cage recess 48.

Figure 7:
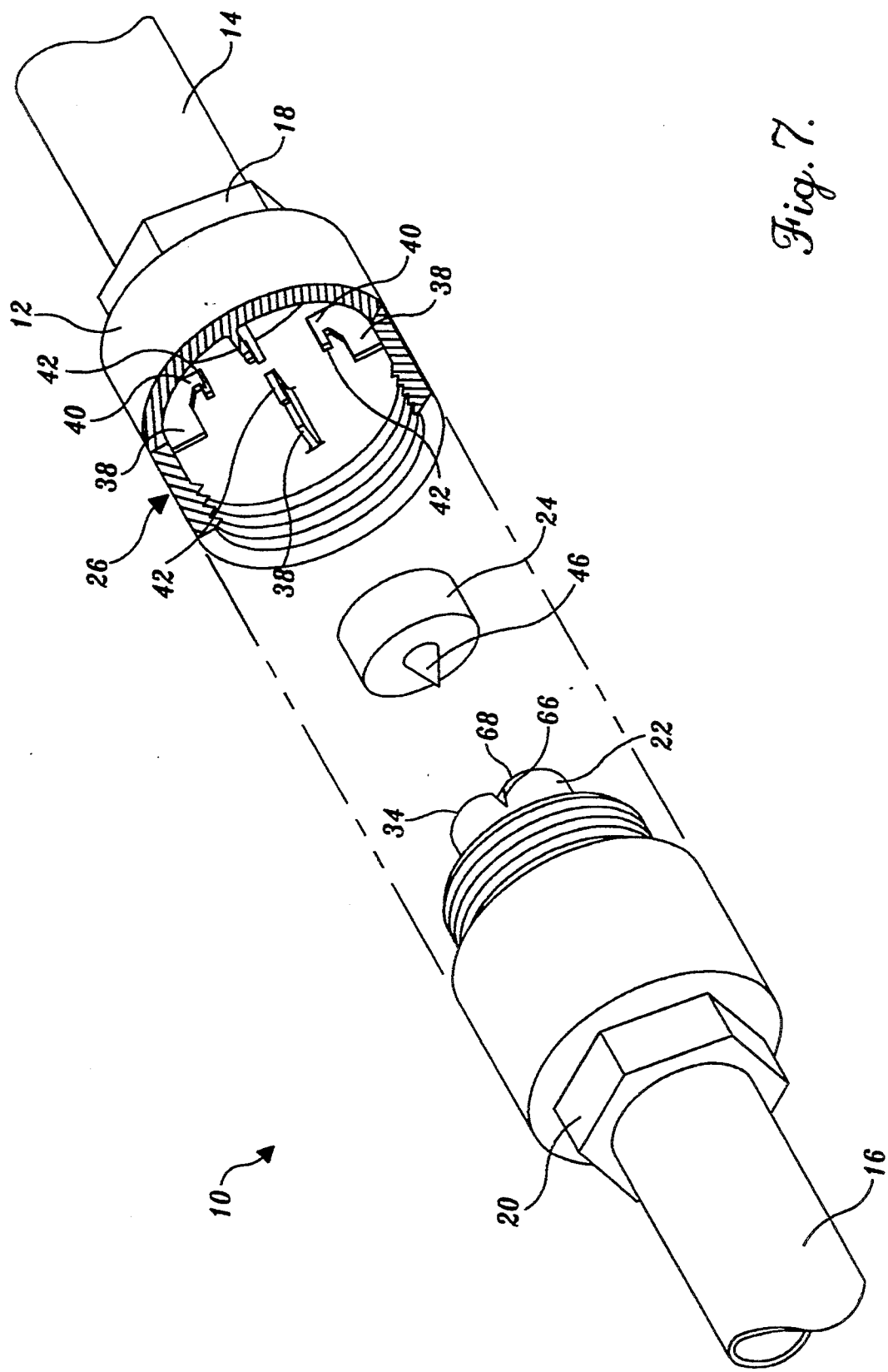
FIG. 7 is an exploded view of an alternate embodiment of the invention having the cage as an integral part of the housing.

Referring now to FIG. 7, another alternate embodiment will be described. This embodiment includes cage 26 and orifice 22 being integral parts of housing 12. Outer wall 72, shown in FIG. 1, is essentially nonexistent in the embodiment illustrated in FIG. 7, unless viewed as being an integral part of the interior walls of housing 12. Cage ribs 38 are formed protruding from the walls of housing 12 in radially inward directions. Housing 12 is a two-piece housing such that diaphragm 24 may be inserted therein.

An alternate form of orifice 22 is also shown in FIG. 7. The form of seat 34 is simply a design choice based on the desired flow conditions and range of allowable pressure drops through valve 10. Orifice 22, shown in FIG. 7, includes two sets of first steeply sloped walls forming two V shapes with gently sloped walls 68 connecting the two V shapes. Alternatively, any of the previously discussed shapes of orifice seat 34 may be employed. Orifice 22 is also an integral part of housing 12, on the outlet side of housing 12. Orifice 22 is cast as part of housing 12 after which seat 34 is milled into the upstream end as desired.

Figure 8:
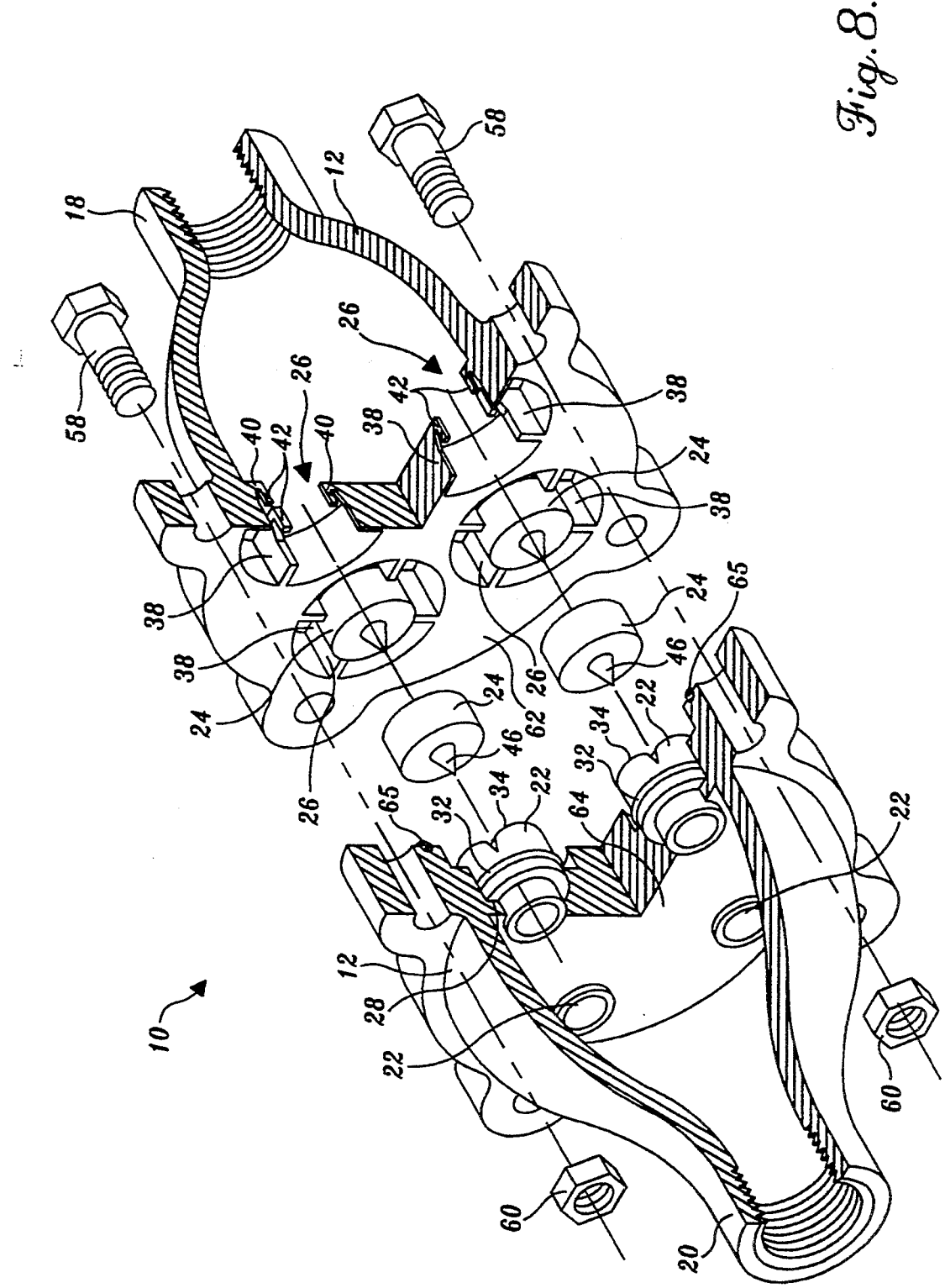
FIG. 8 is an alternate embodiment of the invention showing four valves arranged in parallel fashion within the same housing.

Referring now to FIG. 8, another alternate embodiment will be described. This embodiment is simply an extension of the embodiment described above in connection with FIG. 7. Like the embodiment described above, cage ribs 38 are formed as an integral part of housing 12. However, this embodiment employs four such sets of cage ribs 38 in parallel with four diaphragms 24 and four orifices 22. Instead of threadably engaging the two halves of housing 12, bolts 58 and nuts 60 are used to couple the two halves together. Housing inlet 18 increases in diameter as it nears the internal components of valve 10 and housing outlet 20 does the same as it nears the internal components of valve 10. Thus, space is provided such that four sets of internal components may be used in parallel fashion to allow four times the flow through valve 10. An inlet divider wall 62 provides the structural support to carry cages 26 with diaphragms 24 engaged therein. An outlet divider wall 64 holds orifices 22 in their proper orientations. Outlet divider wall 62 includes shoulders 28 upon which orifices 22 sit, O-rings 32 engaging within outlet divider wall 64 such that flow cannot proceed around the outer surfaces of orifices 22 but must go through the central channels of orifices 22 to exit housing outlet 20.

With the arrangement of the valves in parallel as shown in FIG. 8, four times the flow of a single valve assembly is allowed to exit housing outlet 20. Obviously, other numbers of valve assemblies could be combined to accomplish a desired amount of outlet flow. Of course, the requisite amount of inlet flow must be provided that is greater with a greater number of valve assemblies such that the same pressures are attained.

Figure 9:
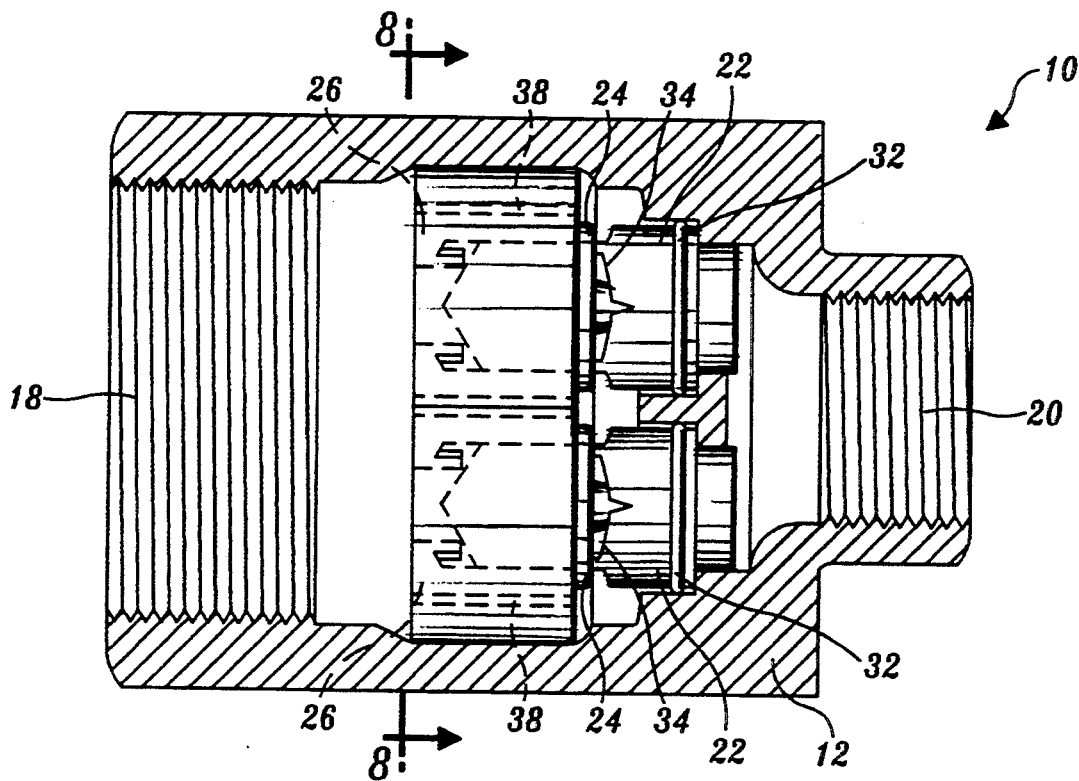
FIG. 9 is a cross-sectional elevational view of an alternate embodiment of the invention showing two valve assemblies side by side.
Figure 10:
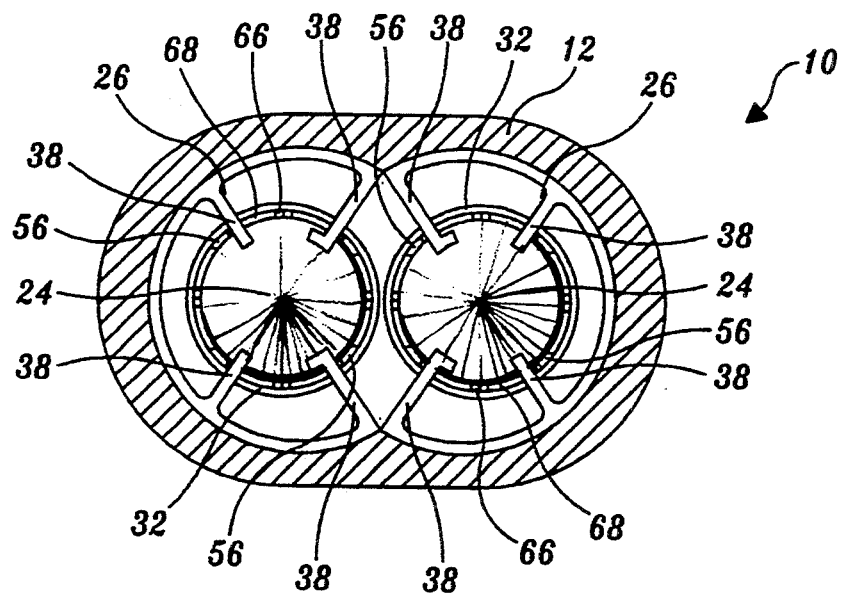
FIG. 10 is a lateral crosscut of the same embodiment as that shown in FIG. 9.

FIGS. 9 and 10 illustrate still another embodiment of the present invention in which a single-piece housing 12 is used to hold two valve assemblies side by side. Each valve assembly includes cage 26, which has outer walls 72 that may be compressed to fit within housing inlet 18 to be placed in its proper orientation. The two internal valve assemblies are oriented side by side with cages 26 having their open ends facing one another such that they nest compactly together in a figure-eight shape, as shown in FIG. 10.

The "C" shaped outer walls 72 provide for denser packing than a cage with a complete perimeter (denser also than a complete bore to house a diaphragm with longer radially extending ears). This denser packing facilitates more economical housing designs by reducing the material cost. The open "C" also allows valve housing designers to take advantage of casting techniques such as "lost foam" or "lost wax" to cast what would have to be a bolted- or screwed-together assembly of two or three components into one piece for the valves 10 that have multiple diaphragms 24 in parallel. A cage without an open section would be difficult to retain in a one-piece design since a retaining plate is normally needed to keep the diaphragms and cages in their respective bores. Such a retaining plate could not be inserted through a bore smaller than the diameter of the plate.

The open C-shaped cage 26 is more forgiving for the tolerance of the bore that it must seat against than is a complete perimeter cage. If the bore is smaller than the diameter of cage 26, the open section of cage 26 will shrink to conform to the out-of-tolerance diameter. The result of this shrinking gap in the cage perimeter causes cage ribs 38 to squeeze into diaphragm 24, which in turn has little or no effect on the accuracy of valve 10. Of course this advantage is also realized in the single valve embodiment as well as the multiple valve embodiments.

Figure 11:
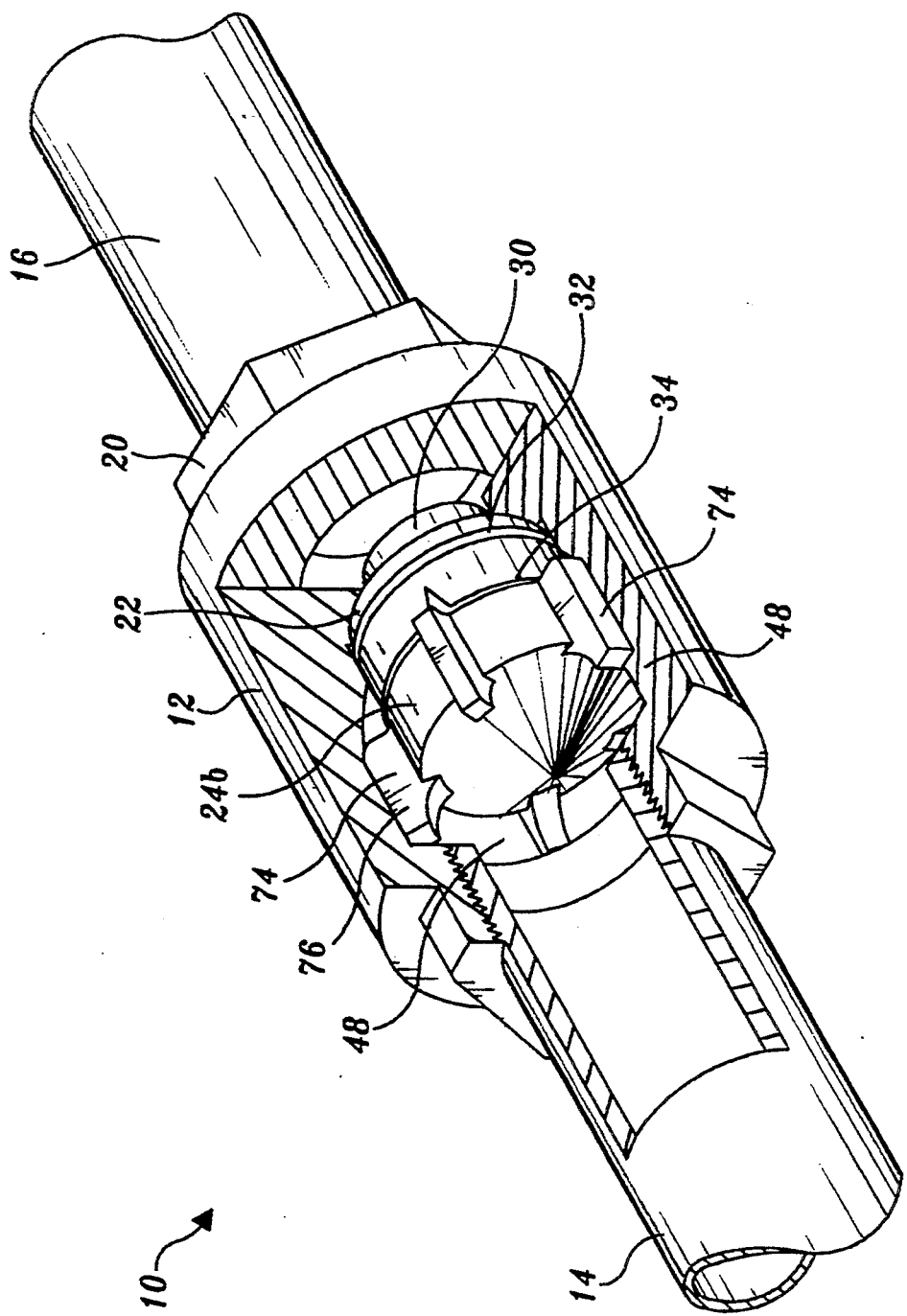
FIG. 11 is an isometric view of another alternate embodiment of the present invention with a portion of the inlet pipe and housing removed to illustrate the internal structure of the valve.

Finally, referring to FIG. 11, another alternate embodiment of the present invention will be described. In this embodiment, the function of cage ribs 38 is embodied in diaphragm ears 74 Diaphragm ears 74 project outwardly from the sidewalls of diaphragm 24 and include horns 76 that extend upstream of the sidewalls. Diaphragm ears 74 are made of the same material as diaphragm 24b, or alternatively, they may be made of a different material. For example, a stiffer material may be desirable. Diaphragm ears 74 space the sidewalls of diaphragm 24b away from cage recess 48 to allow an enlarged flow area, as described above, around diaphragm 24b. The remainder of valve 10 in this embodiment is similar to that described above. Horns 76 projecting from ears 74 provide greater flow passage around the front of diaphragm 24, hence reducing the pressure loss and allowing smaller rubber ears 74 than would otherwise be required.

While the preferred embodiment of the invention has been illustrated and described, along with several alternate embodiments, it will be appreciated that various changes can be made therein without departing from the spirit and scope of the invention. For example, different materials may be used, alternate numbers of internal valve assemblies may be nested together, or other changes may be made to meet the constraints of a particular use. The above detailed description is not meant to limit the invention to those embodiments described, but to be exemplary of the invention through a description of the current preferred forms of carrying out the invention.

Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. An apparatus to control fluid flow comprising:

(a) a housing having two ends, an inlet end having an inlet opening and an outlet end having an outlet opening, the ends being arranged and configured to receive piping;

(b) a first orifice disposed within the housing, the first orifice having an upstream end and a downstream end with a seat formed in the upstream end, the fluid flowing over the seat and through the first orifice before exiting the outlet end of the housing in normal flow;

(c) a first diaphragm disposed within the housing adjacent and upstream of the seat of the first orifice, the first diaphragm having an upstream side, a downstream side, and sidewalls, the downstream side of the diaphragm being opposite the seat such that a pressure drop across the diaphragm pulls the downstream side of the diaphragm toward the seat; and (d) a first cage surrounding at least a portion of the sidewalls of the first diaphragm, the first cage having ribs projecting toward and contacting the sidewalls of the first diaphragm to hold the first diaphragm away from the housing and to allow reduced flow restriction between the housing and the sidewalls.

2. The apparatus of claim 1, wherein the first cage further includes outer walls that abut the interior of the housing, the ribs projecting inwardly from the outer walls of the first cage.

3. The apparatus of claim 2, wherein the outer walls of the first cage form a "C" shape, the first cage being formed of flexible material such that the two ends of the C-shaped walls are compressible toward one another to reduce the overall outer size of the first cage.

4. The apparatus of claim 3, wherein the housing comprises a one-piece housing having an internal cross-sectional area, into which the first cage fits, larger than the cross-sectional area of either the inlet or the outlet openings, the first cage being insertable into the housing, or removable from the housing, by compression of the first cage to reduce its overall outer size such that it is slightly smaller than the size of the inlet opening.

5. The apparatus of claim 4, wherein the first orifice seat includes at least one channel formed therein through which the fluid flows when entering the first orifice before exiting the housing, the first diaphragm regulating flow by moving within the channel when the pressure drop across the first diaphragm increases.

6. The apparatus of claim 5, wherein the housing includes a first cage recess into which the first cage is placed, the apparatus further including a spring disposed within the first cage recess downstream of the first cage, arranged and configured such that the first cage and the first diaphragm, which is held within the first cage, are biased in an upstream direction.

7. The apparatus of claim 4, wherein the first cage includes ribs projecting inwardly from each end of the C-shaped walls, the first cage further including tabs extending from the ribs in directions away from the ends of the C-shaped walls, the tabs being arranged and configured for ease of compression of the first cage for insertion and removal of the first cage from the inlet opening of the housing.

8. The apparatus of claim 3, wherein at least one of the cage ribs extends at least partially over the upstream side of the first diaphragm to prevent the first diaphragm from being moved substantially out of position during backflow conditions.

9. The apparatus of claim 3, wherein the first cage includes at least three ribs that extend at least partially over the upstream side of the first diaphragm to prevent the first diaphragm frown being moved substantially out of position during backflow conditions.

10. The apparatus of claim 9, wherein the first diaphragm includes a conical portion on its downstream side having the point of the conical portion in a downstream direction, the conical portion serving to direct the flow through the first orifice and toward the outlet opening after flowing over the seat, and wherein the upstream side of the first diaphragm is conical.

11. The apparatus of claim 9, wherein at least three ribs have cleats projecting downstream from their extensions over the upstream side of the first diaphragm, the cleats contacting the upstream side of the first diaphragm.

12. The apparatus of claim 1, wherein the first orifice seat includes at least one channel formed therein through which the fluid flows when entering the first orifice before exiting the housing, the first diaphragm regulating flow by moving within the channel when the pressure drop across the first diaphragm increases.

13. The apparatus of claim 12, wherein the at least one channel comprises first steeply sloped walls forming a "V" shape, the point of the "V" being in the downstream direction, and gently sloped walls upstream of the steeply sloped walls.

14. The apparatus of claim 13, wherein the at least one channel further comprises second steeply sloped walls upstream of the gently sloped walls.

15. The apparatus of claim 14, wherein the first orifice seat comprises at least two channels each having first and second steeply sloped walls and gently sloped walls, the second steeply sloped walls of each channel forming legs between the channels extending in an upstream direction on which the downstream side of the first diaphragm comes in contact.

16. The apparatus of claim 12, wherein the first orifice further includes a sleeve on its downstream end.

17. The apparatus of claim 1, wherein the first orifice is separable from the housing, the housing further including a first orifice shoulder upon which the first orifice sits, and wherein the first orifice further includes a sleeve on its downstream end, the sleeve having a smaller perimeter than that of the upstream portion of the first orifice such that the sleeve extends beyond the first orifice shoulder of the housing in a downstream direction.

18. The apparatus of claim 1, wherein the housing includes a first cage recess into which the first cage is placed, the apparatus further including a spring disposed within the first cage recess downstream of the first cage, arranged and configured such that the first cage and the first diaphragm, which is held within the first cage, are biased in an upstream direction.

19. The apparatus of claim 18, wherein the first cage further includes means to hold the first diaphragm sidewalls from substantial downstream movement relative to the first cage.

20. The apparatus of claim 19, wherein the holding means comprise holding tabs attached to at least one of the ribs and a perimeter groove around the first diaphragm, the holding tabs projecting inwardly from the ribs and engaging the perimeter groove.

21. The apparatus of claim 18, wherein the first orifice seat includes at least one channel formed therein through which the fluid flows when entering the first orifice before exiting the housing, the first diaphragm regulating flow by moving within the channel when the pressure drop across the first diaphragm increases.

22. The apparatus of claim 1, wherein the first cage is an integral portion of the housing, the ribs projecting inwardly from the interior walls of the housing.

23. The apparatus of claim 22, wherein at least one of the cage ribs extends at least partially over the upstream side of the first diaphragm to prevent the first diaphragm from being moved substantially out of position during backflow conditions.

24. The apparatus of claim 23, wherein the at least one cage rib includes a cleat projecting downstream from the extension over the upstream side of the first diaphragm, the cleat contacting the upstream side of the first diaphragm.

25. The apparatus of claim 22, wherein the first orifice seat includes at least one channel formed therein through which the fluid flows when entering the first orifice before exiting the housing, the first diaphragm regulating flow by moving within the channel when the pressure drop across the diaphragm increases.

26. The apparatus of claim 1, further comprising:
(a) a second orifice disposed within the housing adjacent the first orifice, the second orifice having an upstream end and a downstream end with a seat formed in the upstream end, fluid flowing over the seat and through the second orifice before exiting the outlet end of the housing in normal flow;
(b) a second diaphragm disposed within the housing adjacent and upstream of the seat of the second orifice, the second diaphragm having an upstream side, a downstream side, and sidewalls, the downstream side of the second diaphragm being opposite the seat such that a pressure drop across the second diaphragm pulls the downstream side of the second diaphragm toward the seat; and
(c) a second cage surrounding at least a portion of the sidewalls of the second diaphragm, the cage having ribs projecting toward and contacting the sidewalls of the second diaphragm to hold the second diaphragm away from the housing and to allow reduced flow restriction between the housing and the sidewalls.

27. The apparatus of claim 26, wherein the first and second cages are integral portions of the housing, the ribs projecting from interior walls of the housing.

28. The apparatus of claim 27, wherein the first and second orifices are integral portions of the housing.

29. The apparatus of claim 1, wherein the first orifice is an integral portion of the housing.

30. The apparatus of claim 1, wherein the first diaphragm includes a conical portion on its downstream side having the point of the conical portion in a downstream direction, the conical portion serving to direct the flow through the first orifice and toward the outlet opening after flowing over the seat.

31. The apparatus of claim 30, wherein the upstream side of the first diaphragm includes a conical portion and wherein the cage is adjacent said conical upstream side.

* * * * *